(12) United States Patent
Sigvardt et al.

(10) Patent No.: US 11,367,420 B2
(45) Date of Patent: Jun. 21, 2022

(54) STRING FOR A MUSICAL INSTRUMENT

(71) Applicant: LARSEN STRINGS A/S, Sønderborg (DK)

(72) Inventors: Kristian B. Sigvardt, Sønderborg (DK); Thomas Zwieg, Aabenraa (DK); Laurits Thorvald Larsen, Sønderborg (DK)

(73) Assignee: LARSEN STRINGS A/S

( * ) Notice: Subject to any disclaimer, the term of this patent is extended or adjusted under 35 U.S.C. 154(b) by 0 days.

(21) Appl. No.: 17/293,673

(22) PCT Filed: Nov. 15, 2019

(86) PCT No.: PCT/EP2019/081486
§ 371 (c)(1),
(2) Date: May 13, 2021

(87) PCT Pub. No.: WO2020/099635
PCT Pub. Date: May 22, 2020

(65) Prior Publication Data
US 2021/0407470 A1    Dec. 30, 2021

(30) Foreign Application Priority Data
Nov. 16, 2018  (EP) .................................... 18206870

(51) Int. Cl.
*G10D 3/10* (2006.01)
*B21F 3/00* (2006.01)
*B29D 99/00* (2010.01)

(52) U.S. Cl.
CPC ................. *G10D 3/10* (2013.01); *B21F 3/00* (2013.01); *B29D 99/0078* (2013.01)

(58) Field of Classification Search
CPC ... G10D 3/10; G10D 1/02; G10D 3/00; B21F 3/00; B29D 99/0078
See application file for complete search history.

(56) References Cited

U.S. PATENT DOCUMENTS

| | | |
|---|---|---|
| 2009/0183620 A1 | 7/2009 | Klanner |
| 2010/0071529 A1 | 3/2010 | Infeld |
| 2011/0005365 A1* | 1/2011 | Landtroop ............... G10C 3/06 |
| | | 84/297 S |
| 2015/0269917 A1 | 9/2015 | Zwieg |
| 2017/0352335 A1 | 12/2017 | Franz et al. |
| 2017/0365238 A1* | 12/2017 | Elliott ...................... G10D 3/10 |

FOREIGN PATENT DOCUMENTS

| | | |
|---|---|---|
| EP | 3113170 A1 | 1/2017 |
| GB | 2516324 A | 1/2015 |

\* cited by examiner

*Primary Examiner* — Kimberly R Lockett
(74) *Attorney, Agent, or Firm* — BakerHostetler

(57) ABSTRACT

The invention relates to a string (1) for a stringed, bowed musical instrument, for example a bowed musical instrument like violin, viola or cello. The string has a first, load bearing core (10) and a winding strand (100) wound around the first core in helical windings. A damping agent (40) suitable for vibration damping is arranged in a profiled recess (150) in the winding strand. The recess is functioning as a reservoir between the first core and the winding strand. The reservoir is containing and/or retaining the damping agent so as to, at least, reduce dissipation of the damping agent through a gap between the adjacent helical windings of the winding strand. The invention results in a longer lifetime with optimum acoustic properties of the string.

20 Claims, 10 Drawing Sheets

STRING FOR A MUSICAL INSTRUMENT

CROSS-REFERENCE TO RELATED APPLICATIONS

This application is the National Stage of International Patent Application No. PCT/EP2019/081486, "An Improved String for a Musical Instrument" (filed Nov. 15, 2019), which claims priority to EP Patent Application No. 18206870.0 (filed Nov. 16, 2018). The foregoing applications are incorporated herein by reference in their entireties for any and all purposes.

FIELD OF THE INVENTION

The present invention relates to a string for a bowed musical instrument, such as a violin, viola or cello. Furthermore, the invention relates to a method for producing aforementioned string and a stringed instrument mounted with the strings as described in the present invention.

BACKGROUND OF THE INVENTION

Strings for bowed musical instruments typically consists of a load-bearing core with several layers of winding, which add thickness and mass to the string. The winding layers can be either metal wire, flat or round, or polymer filament, either mono- or multifilament. In the case of monofilament winding, this most often has a circular cross-section, or in some cases, a rectangular one.

In between the winding layers, string manufacturers have the option of applying a damping agent. The damping agent has an influence on the sound properties of the string and allows the string manufacturer to create a unique sound profile for any given string. The unique sound profile of the string is influenced by both the type and amount of damping agent applied to the string, as well as the location on the string where the agent is applied, i.e. between which two layers it is applied. The damping agent can be a type of polymer adhesive, natural or synthetic wax, or the like. It is typically a fluid with higher viscosity than water at room temperature.

The damping agent is located primarily in two types of regions on the string. The first region is the void that is created between adjacent winding strands, as these winding strands have rounded edges. The second type of region is on the surface of the winding strand, i.e. between the winding layers, where the damping agent acts as a coating or partial coating for the strand.

As it turns out, the damping agent also has an influence on the lifetime of the string. The lifetime refers to the amount of time the musician can play on the string, before the string needs to be replaced. This varies from string to string and is generally shorter for higher pitched strings.

Regarding acoustical properties of a string and the strings corresponding lifetime, the string evolves through three phases. A first phase, when the string is new, wherein the string undergoes a playing-in phase and its acoustical properties develops in a positive manner. From the playing-in phase, the string gradually evolves into its optimum playing phase, where the acoustical properties of the string are at its best. From the optimum phase, which have a given timely length, the strings acoustical properties deteriorate to a suboptimal phase in which, the string is by all means still playable, but for most professional musicians, to be considered as sub-standard, at which point its lifetime expires and the musician replace the string. Hence, the most important part of the lifetime of a string, from as musicians perspective is the optimal acoustic phase.

There may be several reasons for the string needing to be replaced, but one of them is that the sound profile changes in a negative way. The sound may become rough or metallic or it may lose depth or focus, among other negative effects. This may be due to material fatigue in the core or winding materials. However, this effect has been observed to take a longer time than the actual lifetime of the strings with the shortest lifetime. The change in sound properties over the lifetime of a string most likely also has to do with the damping agent applied to the string. The damping agent may leak out through the windings of the string as it is being played. Over time, the damping agent may harden or become oxidized, or it may change as it becomes saturated with dirt, sweat, and resin residue from being played by the musician. This effect seem to occur on a much shorter time scale compared to material fatigue, and it is therefore generally regarded as the main effect responsible for the short lifetime of a musical string.

One way to overcome the issue with the damping agent is to increase the amount of damping agent applied to the string. More damping agent typically translates to a longer lifetime of the string, as it takes longer time for the damping agent to reach the sub-optimal phase, hence the point of replacement of the string. However, currently there is a practical limit to how much damping agent can be added to the string, before the string is saturated, and the damping agent leaks through the windings, onto the surface of the string. Furthermore an excessive amount of damping agent may risk to make the sound of the string sound dull and muted, which are undesired acoustical properties.

Another method for overcoming the durability issue is to seal in the damping agent on the string. Whenever there is a winding, there is a separation/gap between adjacent windings. The separation between two adjacent windings is relatively small, and when observing a winding layer, it is seen that the adjacent windings are in contact with each other, thereby closing the gap. However, when the string is tensioned/stretched on the instrument, and it is being played, it vibrates at several hundred to several thousand times per second, which cause the damping agent to leak out of the gap, even when attempting to wind the winding layer in a tight manner.

Hence, an improved string for a musical instrument would be advantageous, and in particular a more durable and high quality musical string would be advantageous.

DESCRIPTION OF SOME PRIOR ART

GB2516324A describes a resonating string assembly for musical instruments, such as guitars. However, this disclosure does not contain damping agent as guitar strings are never dampened with a damping agent and is thus, not suitable for a bowed instrument. This reference is instead designed with the purpose of achieving specific "contact points" relative to a core and any adjacent winding strands, so as to have specific resonating abilities built into the string. The opening and closing of the string, as described in this disclosure is desirable, for guitar instruments, to achieve said resonating abilities.

OBJECT OF THE INVENTION

It is a further object of the present invention to provide an alternative to the prior art.

In particular, it may be seen as an object of the present invention to provide a musical string that solves the above mentioned problems of the prior art with relatively low lifetime of strings.

SUMMARY OF THE INVENTION

Thus, the above described object and several other objects are intended to be obtained in a first aspect of the invention by providing a string for a stringed, bowed musical instrument, such as a violin, viola or cello, the string comprising:
- at least one first, load bearing core having an outer surface,
- at least one first winding strand wound around the first core in helical windings, said first winding strand having an inner surface wherein said inner surface of the first winding strand is opposing the outer surface of the core, and
- at least one damping agent suitable for vibration damping, said damping agent arranged in between the outer surface of the first core and the inner surface of the first winding strand, wherein the inner surface of the first winding strand comprises at least one profiled recess at said inner surface, said recess functioning as a reservoir between the first core and the first winding strand, said reservoir being suitable for containing and/or retaining the damping agent so as to, at least, reduce dissipation of said damping agent through a gap between the adjacent helical windings of the first winding strand.

The invention is particularly, but not exclusively, advantageous for prolonging the lifetime of a musical string. As the acoustic properties are dependent on the damping agent and the damping agent are retained and/or contained for a prolonged period, the present invention provides musicians with a string that has a longer lifetime in which the phase of optimum acoustic properties are extended. Current data indicates a two to threefold increase in lifetime, relative to a comparable state of the art, commercially available string, which is significant within the relevant applications of the string.

In this context, a sub-optimal phase in the lifetime of a string is regarded as the point in time, at which, the string is normally changed within a professional context. At this point, the sound of the string has changed in a negative/undesirable way, so that the sound no longer reflects its intended design. This does not mean that the string is unplayable, because many musicians play on strings way past the optimal playable phase, as new strings, especially for the cello, can be relatively expensive for the individual player. The string will still have some qualities after entering the sub-optimal phase, they are just different from the intended/optimal qualities. One of the benefits from using winding strands with profiled recess in the string construction, according to the present invention, is that it pushes the arrival sub-optimal phase into the future. Tests performed by the applicant, indicates a prolonged optimal playable phase of strings of up to three times the normal lifetime, possibly even more.

The present invention is preferably applied for a stringed musical instrument, preferably a bowed musical instrument, such as a violin (first and/or second), viola or cello, but other stringed instruments like guitar, ukulele, banjo, contrabass, doubles basses, lutes, harps, zithers etc. are contemplated for application with the present invention. Also the string could be applicable for other, non-European traditional instruments, such as, but not limited to, traditional Chinese instruments, such as the erhu or the pipa.

In the context of the present invention, the load bearing core is to be understood as the innermost part of the string and that the core can comprise a single wire (metal or fiber), a plurality of fibers (metal or fiber or combination thereof), filaments or wires braided, weaved or in another way merged together, to form the core of the string of which additional strands, can be wound around. The load bearing core is understood to be tension carrying part of the string. It is contemplated that a second, a third etc. load bearing core may be applied within in the context of the present invention.

In the context of the present invention, a profile is to be understood as an outline seen or represented in sharp relief, such as a contour. Furthermore, the profiled recess is understood to be an intentional structure in the winding strand, said recess being deliberately made and/or introduced during the manufacturing of the musical string, i.e. not random scratches and cuts during the manufacturing.

In the context of the present invention, reservoir is to be understood as a cavity, void or space, the reservoir having a volume for containing and/or retaining a substance, such as a damping agent, polymer matrix or fluid. It is understood the recess forming the reservoir may be adjacent the first load bearing core, but alternatively or additionally a recess in the first winding strand can be separated by one, or more, intermediate winding strands.

In the context of the present invention, damping agent is to be understood as a polymer adhesive, natural or synthetic wax, or the like. A damping agent for musical strings is typically a fluid with higher viscosity than water, at room temperature. The purpose of providing a fluid on the string is to dampen unwanted frequencies and to adjust the sound, in order to obtain the desired properties. Some fluids are applied to create a warmer sound, some fluids give a more brilliant sound, and some fluids can influence the playability and the feeling of the string to the musician. The effect of the damping agents can be referred to as internal damping in the string.

Damping agents can be selected from a broad range of fluids, both natural (both animal and vegetable) and synthetic, including wax, fatty acids (both saturated and unsaturated), rosins, and polymer liquids. Also, damping agents can be mixtures of two or more types of liquids, which are mixed before they are applied to the string. These mixtures can be, for example, an oil and a rosin, or a polymer and a wax. This is not an exhaustive list, by the skilled person is aware that there is common and publicly available knowledge about which types of damping agents are suitable for various music strings, see US US2017004810 (A1) section [0077]-[0094]-[0095] and [0098]. It may be important that the applied fluid has a certain viscosity, such that it does not simply seep out of the recess of the winding strand.

Commonly applied damping agents are natural resins, preferable natural resins based on colophony and colophony derivates, synthetic resins, preferable polyamide and polyimide resins, phenolic resins, polyester resins and epoxy resins, natural or synthetic types of wax, higher viscosity oils as well as blends of resins, wax and/or oils. It is a fluid with distinct higher viscosity than water at room temperature.

In the context of the present invention, gap is to be understood as the space between one winding around an elongate object and the next, adjacent winding, wherein a winding strand wound around a first load bearing core creates a continuous helical gap as the winding strand is being laid adjacent to itself around the core. A gap can also be understood a the space between two or more winding strands which is wound, in parallel, adjacent to each other, around a core, so as to create a plurality of continuous helical gaps along the length of the core.

In the context of the present invention, dissipate is to be understood as a matter or material spreading thin, scattering, eroding, evaporating, dissoluting or in another way gradually vanishing or disappearing over time and/or through movement, such as vibration.

In an advantageous embodiment of the invention, the first winding strand of the musical string furthermore has an outer surface and wherein said outer surface of the winding strand has a profiled recess suitable for containing and/or retaining a damping agent. It is to be understood that, depending on the number of winding strands and whether or not the winding strands lay on top of each other, or adjacent to each other along a length of the load bearing core of the string, the outer surface of one winding strand can touch upon the inner surface of a second winding strand, thus a profiled recess of one winding strand can potentially engage with or come in connection to a profiled recess of a second winding strand.

In an advantageous embodiment of the invention, the damping agent contained and/or retained within the profiled recess of the outer surface of the first winding strand is the same or differs from the damping agent contained and/or retained within the profiled recess of the inner surface of said first winding strand. It is to be understood that one or more damping agents can be used in the manufacturing of a string according to the present invention and that two or more damping agents may come into contact with each other and/or mix, depending on the design of the plurality of profiled recesses and the method of winding the winding strands around the load bearing core.

In an advantageous embodiment of the invention the profiled recess on the inner surface of the first winding strand may differ in size and/or shape from the profiled recess on the outer surface of said first winding strand. In this particular embodiment the size of a profiled recess on an inner surface can be either larger or smaller in cross-sectional area than a profiled recess of an outer surface and also the specific shape of a profile of said profiled recess may differ to optimize either the acoustic properties of the string, to extend the lifetime of the string through optimized containment of damping agent within the recesses.

In an advantageous embodiment of the invention, the string further comprises a second winding strand wound around the first load bearing core in parallel and adjacent to the helical windings of the first winding strand, wherein said second winding strand has a profiled recess on an inner or outer surface differing in size and/or shape from a corresponding profiled recess of an inner and/or outer surface of the first winding strand. In this particular embodiment the size of a profiled recess on an inner or outer surface of a first winding strand can be either larger or smaller in cross-sectional area than a profiled recess of an inner or outer surface of a second winding strand and also the specific shape of a profile of said corresponding profiled recesses of two winding strands may differ to optimize either the acoustic properties of the string, to extend the lifetime of the string through optimized containment of damping agent within the recesses and/or interaction with an adjacent surface and respective recess of a second and/or third winding strand.

In an advantageous embodiment of the invention the string further comprises a third winding strand wound around the first load bearing core, in a helical manner, in parallel and adjacent to the helical windings of the first winding strand and/or the second winding strand, wherein said third winding strand has a profiled recess on an inner and/or outer surface differing in size and/or shape from a corresponding profiled recess of an inner and/or outer surface of an adjacent winding strand. In this particular embodiment the size of a profiled recess on an inner or outer surface of a third winding strand can be either larger or smaller in cross-sectional area than a profiled recess of an inner or outer surface of a first or second winding strand and also the specific shape of a profile of said corresponding profiled recesses of two or more winding strands may differ to optimize either the acoustic properties of the string, to extend the lifetime of the string through optimized containment of damping agent within the recesses and/or interaction with an adjacent surface and respective recess of a first and/or second winding strand.

In an advantageous embodiment of the present invention according to the first aspect of the invention, the string further comprises a second and/or third winding strand and wherein the first winding strand is wound around the first load bearing core, the second winding strand is wound around the first winding strand and the third winding strand is wound around the second winding strand, so as to create a core with a plurality of layers wound around said core, wherein each layer comprises a winding strand. In this embodiment, the load bearing core is at the core of the musical string, a first winding strand may be a first layer wound around said core, a second winding strand may be a second layer, a third winding strand may be a third layer, a fourth winding strand may be a fourth layer, a fifth winding strand may be a fifth layer and a sixth winding strand may be a sixth layer, and in between each of the layers, a damping agent may be applied and the damping agent between each of the layers may differ from the damping agent in between another layer. It is to be understood that the musical string in the present invention may comprise more than 10 layers. Thus, in some embodiments, there may be one winding strand in two or three layers on top of each other, or up to five stacked layers, but alternatively each layer can have several different winding strands. For example, there may be 2-10 different winding strands, e.g. five different winding strands in a single layer, and/or in different layers. In this case, a winding strand of multifilament containing, e.g. 36 single filaments in a bundle, is considered as being a single winding strand.

In an advantageous embodiment of the invention, the cross-sectional area of the profiled recess extending, at least partly, along a length of either an inner or outer surface of the first, a second, and/or a third winding strands and a cross-sectional area of said first, second, and/or third winding strands has a ratio of between 1:100 and 10:1, more preferably between 1:50 and 1:1 and most preferably between 1:11 and 1:4. These ratios are ratios between cross-sectional areas of the winding strand and the profiled recess (not Aspect ratios). As the skilled person will understand these cross-sectionals areas may slightly change, e.g. a 1-3%, from an unloaded or not tensioned state on the string to a tensioned state applied on the string. In the absence of remarks to the contrary, the said ratio values are in an un-tensioned state on the string. The ratios may also slightly change over time due to playing of the string.

In an advantageous embodiment of the invention, a cross-sectional area of the first, second, and/or third winding strand and/or a cross-sectional area of the profiled recess, at least partly, along a length of an inner surface and/or outer surface of a first, second and/or third winding strand, comprise a shaped profile such as a round, triangular, rectangular, squared, pentagonal, hexagonal, heptagonal, octagonal, star-shaped, arch-indented or wave profile, and any approximations and/or any combinations thereof. It is to be understood that all shapes may be approximations due to manufacturing limitations. Furthermore it is to be understood that any combination of wire strands with any number of profiled recesses each having various sizes and shapes, may be used to create a musical string according to the present invention, in order to obtain certain acoustic properties and/or extended lifetime.

In an advantageous embodiment of the invention, the first load bearing core may be manufactured from a metal such as steel or a polymer, such as a monofilament, or multifilament, made of for example Polyamide, PEEK or polyester.

It is to be understood that the core of a musical string, according to the present invention, may be manufactured from a plurality of core elements weaved, braided or in another way merged together, such as polymer strands, organic or non-organic fibres, metal, shape-memory-alloys or any combination thereof.

In a more advantageous embodiment of the invention, the core may be manufactured as a wire-rope or rope-core with a plurality of strands, typically made from a metal or a polymer, wherein the plurality of strands and the geometric arrangement of wires within the strands make up the wire-rope construction.

In a most advantageous embodiment of the invention, the core may be either, round, ellipsoid, triangular, rectangular, squared, pentagonal, hexagonal, heptagonal or octagonal. It is to be understood that all shapes may be approximations due to manufacturing limitations.

In an advantageous embodiment of the invention, the first, second and/or third winding strand may be manufactured from a polymer such as but not limited to polyamide, PEEK or polyester, Polyamide, PEK, PVDF, PPS, Aramide, PAEK, PBT, Polyethylene, PET, Polypropylene, PVC, PTFE, Polycarbonate, Polyimide, LCP or a metal, such as steel, aluminium, titanium, silver, wolfram, nickel, constantan, monel, hydronalium, gold and copper, shape-memory-alloys, organic or non-organic fibres or any combination of any of the aforementioned materials.

In an advantageous embodiment of the invention, a second and/or third winding strand may be made from a material differing from the material of the first winding strand. It is to be understood that a first winding strand may be made from a material A, such as metal, a second winding strand may be made from a material B, such as a polymer and a third winding strand may be made from a material C, such as a metal different from material A. Or a first and a second winding strand may be made from a material A and a third winding strand may be made from a material B.

In an advantageous embodiment of the invention, the first, second and/or third winding strand may be wound around the first, load bearing core in a helical manner at an angle relative to a length axis of the first core between 10 and 170 degrees, more preferably 30 and 150 degrees and most preferably between 60 and 120 degrees.

In a second aspect the present invention relates to a stringed, bowed musical instrument such as a violin, viola or cello, the musical instrument comprising:
a base,
a neck,
a plurality of strings individually attached at the base at, or near, and at, or near, the neck of said stringed musical instrument, the strings comprising
    a first, load bearing core having an outer surface,
    at least one first winding strand wound around the first core in helical windings, said first winding strand having an inner surface wherein said inner surface of the first winding strand is opposing the outer surface of the first core, and
    a damping agent suitable for vibration dampening, said damping agent arranged in between the outer surface of the first core and the inner surface of the first wind strand,
    wherein the inner surface of the first winding strand comprises at least one profiled recess at, at least partly, a length of said inner surface, said recess functioning as a reservoir between the first core and the first winding strand, said reservoir being suitable for containing and/or retaining the damping agent so as to, at least, reduce dissipation of said damping agent through a gap in the adjacent helical windings of the first winding strand.

In an advantageous embodiment of the invention, the plurality of strings all have different, complimenting acoustic properties gained through various combinations of number of winding strands, size and shape of profiled recesses within each winding strand of each individual string of said plurality of strings, and either identical or different damping agents contained and/or retained within the profiled recesses of said winding strands within each individual string of said plurality of strings.

The invention further relates, in a third aspect, to a method for manufacturing strings for a bowed musical instrument, such as a violin, viola or cello, the method comprising:
    providing a first load bearing core having an outer surface,
    providing a first winding strand having an inner surface, said inner surface comprising a profiled recess, at least partly, along a length of the inner surface,
    applying a damping agent to the outer surface of the first core and/or to said profiled recess on the first winding strand, and-winding the first winding strand around the first core in a helical manner,
so as to substantially cover the outer surface of the first load bearing core with the first winding strand and wherein the damping agent is contained and/or retained in the profiled recess of said first winding strand.

In the context of the present invention, the skilled person will understand that a string typically has one playable section and two sections for fastening or fixating said string to an instrument. The invention will normally be implemented but not limited to the playable section, i.e. in some embodiments it may additionally be applied to the fastening sections depending on the manufacturing process.

The third aspect of the invention is particularly, but not exclusively, advantageous in that the method according to the present invention may be implemented by providing a string for a stringed instrument according to the first aspect at any point of the supply chain where feasible.

In a fourth aspect, the invention relates to a method for containing and/or retaining a damping agent between an outer surface of a first load bearing core and an inner surface of a first winding strand of a string for a bowed musical instrument, such as a violin, viola or cello, the method comprising:
    creating a profiled recess on the inner surface of the first winding strand,
    applying a damping agent to the outer surface of the first core and/or to said profiled recess on the first winding strand, winding the first winding strand around the outer surface of the first core in a helical manner, with the profiled recess of the inner surface of the first winding strand oriented towards the outer surface of said first core, so as to enable the damping agent applied to the outer surface of the first core and/or to said profiled recess on the first winding strand to be contained and/or retained in the profiled recess of the winding strand when the inner surface of the first winding strand comes into contact with the outer surface of the first core and thus the damping agent positioned on said outer surface.

In the context of the present invention, the application of the damping agent can be done through a range of methods, such as, but not limited to dipping, spraying, painting, swapping or brushing.

This aspect of the invention is particularly, but not exclusively, advantageous in that the method according to the present invention may be implemented by using existing manufacturing methods and machines in combination with new methods and/or machines so as to reduce at least an amount of the additional expenditure, consumption and emissions often related with creating new and improved manufacturing methods and/or goods.

In a fifth aspect, the invention relates to a string for a stringed musical instrument, preferably a bowed musical instrument, such as a violin, viola or cello, the string comprising:
- at least one first, load bearing core having an outer surface,
- at least one first winding strand wound around the first core in helical windings, said first winding strand having an inner surface wherein said inner surface of the first winding strand is opposing the outer surface of the core, and
- at least one damping agent suitable for vibration damping, said damping agent arranged in between the outer surface of the first core and the inner surface of the first winding strand, wherein the inner surface of the first winding strand comprises at least one profiled recess at said inner surface, said recess functioning as a reservoir between the first core and the first winding strand, said reservoir being suitable for containing and/or retaining the damping agent so as to, at least, reduce dissipation of said damping agent through a gap between the adjacent helical windings of the first winding strand.

This aspect of the invention is advantageous in that the string, according to the fifth aspect, may provide a durable string or set of strings, which can be used not only on bowed instruments, but also strings to be fitted on instruments such as a guitar or harp, in which the strings are not played with a bow, but by strumming or striking said strings.

In a sixth aspect, the invention relates to a stringed musical instrument, preferably a bowed musical instrument, such as a violin, viola or cello, the musical instrument comprising:
- a base,
- a neck,
- a plurality of strings individually attached at the base at, or near, and at, or near, the neck of said stringed musical instrument, the strings comprising
  - a first, load bearing core having an outer surface,
  - at least one first winding strand wound around the first core in helical windings, said first winding strand having an inner surface wherein said inner surface of the first winding strand is opposing the outer surface of the first core, and
  - a damping agent suitable for vibration dampening, said damping agent arranged in between the outer surface of the first core and the inner surface of the first wind strand, wherein the inner surface of the first winding strand comprises at least one profiled recess at, at least partly, a length of said inner surface, said recess functioning as a reservoir between the first core and the first winding strand, said reservoir being suitable for containing and/or retaining the damping agent so as to at least reduce said damping agent from dissipating through a gap in the adjacent helical windings of the first winding strand.

In a seventh aspect, the invention relates to a method for manufacturing strings for a musical instrument, preferably a bowed instrument, such as a violin, viola or cello, the method comprising:
- providing a first load bearing core having an outer surface,
- providing a first winding strand having an inner surface, said inner surface comprising a profiled recess, at least partly, along a length of the inner surface,
- applying a damping agent to the outer surface of the first core and/or to said profiled recess on the first winding strand, and-winding the first winding strand around the first core in a helical manner, so as to substantially cover the outer surface of the first load bearing core with the first winding strand and wherein the damping agent is contained and/or retained in the profiled recess of said first winding strand.

In an eighth aspect, the invention relates to a method for containing and/or retaining a damping agent between an outer surface of a first load bearing core and an inner surface of a first winding strand of a string for an instrument, preferably a bowed musical instrument such as a violin, viola or cello, the method comprising:
- creating a profiled recess on the inner surface of the first winding strand,
- applying a damping agent to the outer surface of the first core and/or to said profiled recess on the first winding strand,
- winding the first winding strand around the outer surface of the first core in a helical manner, with the profiled recess of the inner surface of the first winding strand oriented towards the outer surface of said first core, so as to enable the damping agent applied to the outer surface of the first core and/or to said profiled recess on the first winding strand to be contained and/or retained in the profiled recess of the winding strand when the inner surface of the first winding strand comes into contact with the outer surface of the first core and thus the damping agent positioned on said outer surface.

The first, second, third, fourth, fifth, sixth, seventh and eighth aspect of the present invention may each be combined with any of the other aspects. These and other aspects of the invention will be apparent from and elucidated with reference to the embodiments described hereinafter.

BRIEF DESCRIPTION OF THE FIGURES

The string for a stringed instrument according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
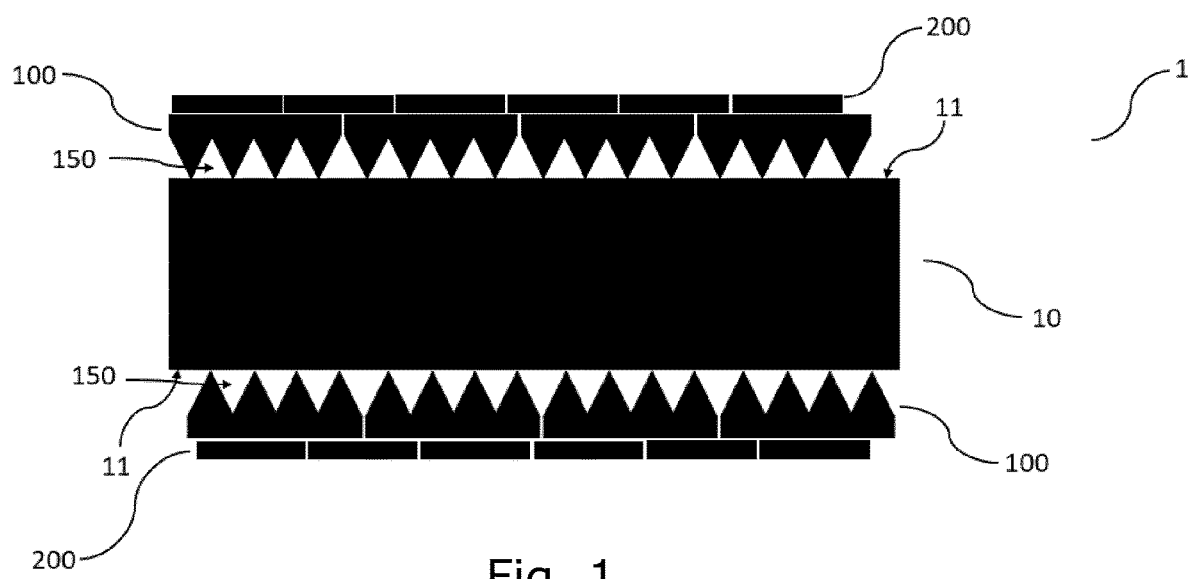
FIG. 1 is a view of a longitudinal cross-section of a string according to an embodiment of the present invention.

FIG. 1 is a view of a longitudinal cross-section of a string 1. In the figure, the core 10 is at the centre of the string 1, with a first winding strand 100 helically wound around the outer surface 11 of the core 10. A second winding strand 200 is wound around the first winding strand 100. Only the first winding strand are seen to schematically have profiled recesses 150 (saw-tooth pattern facing the core 10 from above and below in this view) for containing and/or retaining any damping agent (not shown here, cf. FIG. 2).

Figure 2:
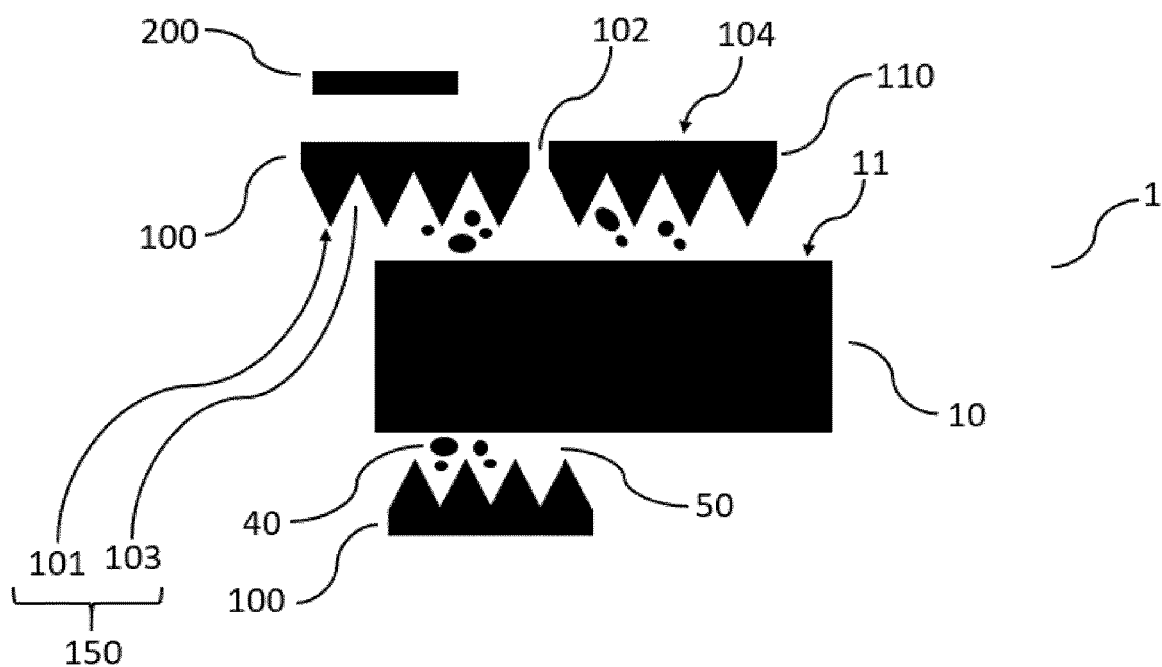
FIG. 2 is an exploded view of a longitudinal cross-section of a string similar to the embodiment shown in FIG. 1.

FIG. 2 is an exploded view of a longitudinal cross-section of a string 1. The exploded view of the string 1 shows part of the core 10 with an outer surface 11. Around the core 10, a first winding strand 100 is wound in a helical manner so as to have a second winding 110 of the same first winding strand 100 adjacent to itself. In between the two adjacent windings 100 and 110, a gap 102 is formed. In the space 50, between the core 10 and the first winding strand, a damping agent 40 is applied. The damping agent 40 is a viscous material which may partly cover the outer surface 11 of the core 10, the inner surface 101 of the first winding strand 100 and at least partly fill the void 103, created by the profiled recess 150 of the inner surface 101 so as to contain and/or retain the damping agent 40 from dissipating through the gap 102 between the adjacent windings 100 and 110. Thus, the profiled recess 150 may be formed by the inner surface 101 having a plurality of voids 103. A second winding strand 200 is wound around the outer surface 104 of the first wind strand.

Figure 3:
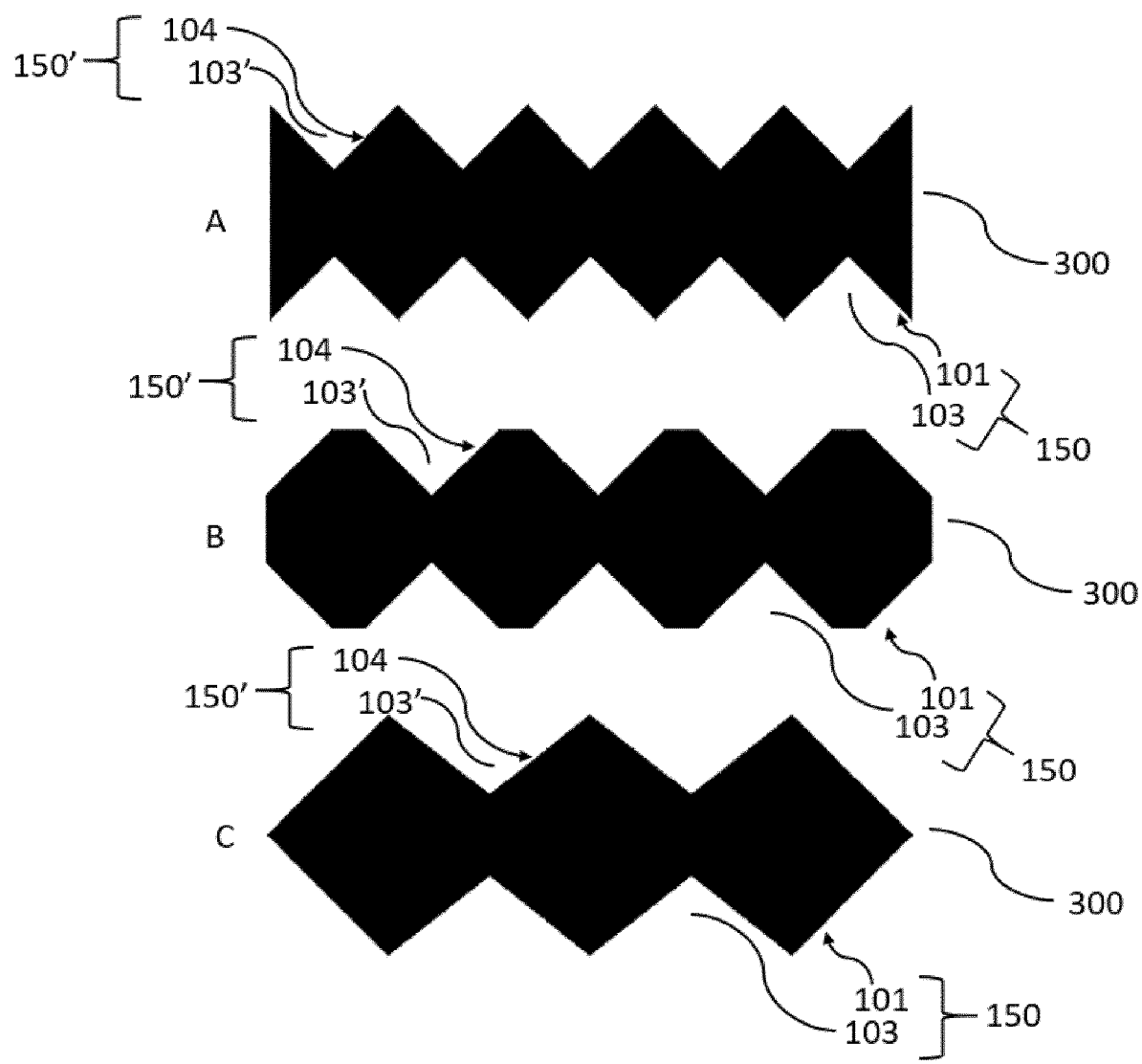
FIG. 3 is a schematic drawing of various cross-sectional shapes of a winding strand with various profiled recesses according to some embodiments of the present invention.

FIG. 3 is schematic drawing of various cross-sectional shapes of a winding strand 300 with various profiled recesses 150 according to some embodiments of the present invention.

FIG. 3A shows a first variant of a winding strand 300 with a void 103 having a triangular shape, formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300. It is to be understood that a profiled recess 150 may repeat a number of times along the inner surface 101 of a winding strand 300, such as repeating two times, such as three times, such as four times or such as five times so as to form a saw-tooth like shape.

FIG. 3B shows a second variant of a winding strand 300 with a void 103 having a triangular shape, formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

FIG. 3C shows a third variant of a winding strand 300 with a void 103 having a triangular shape, formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

Figure 4:
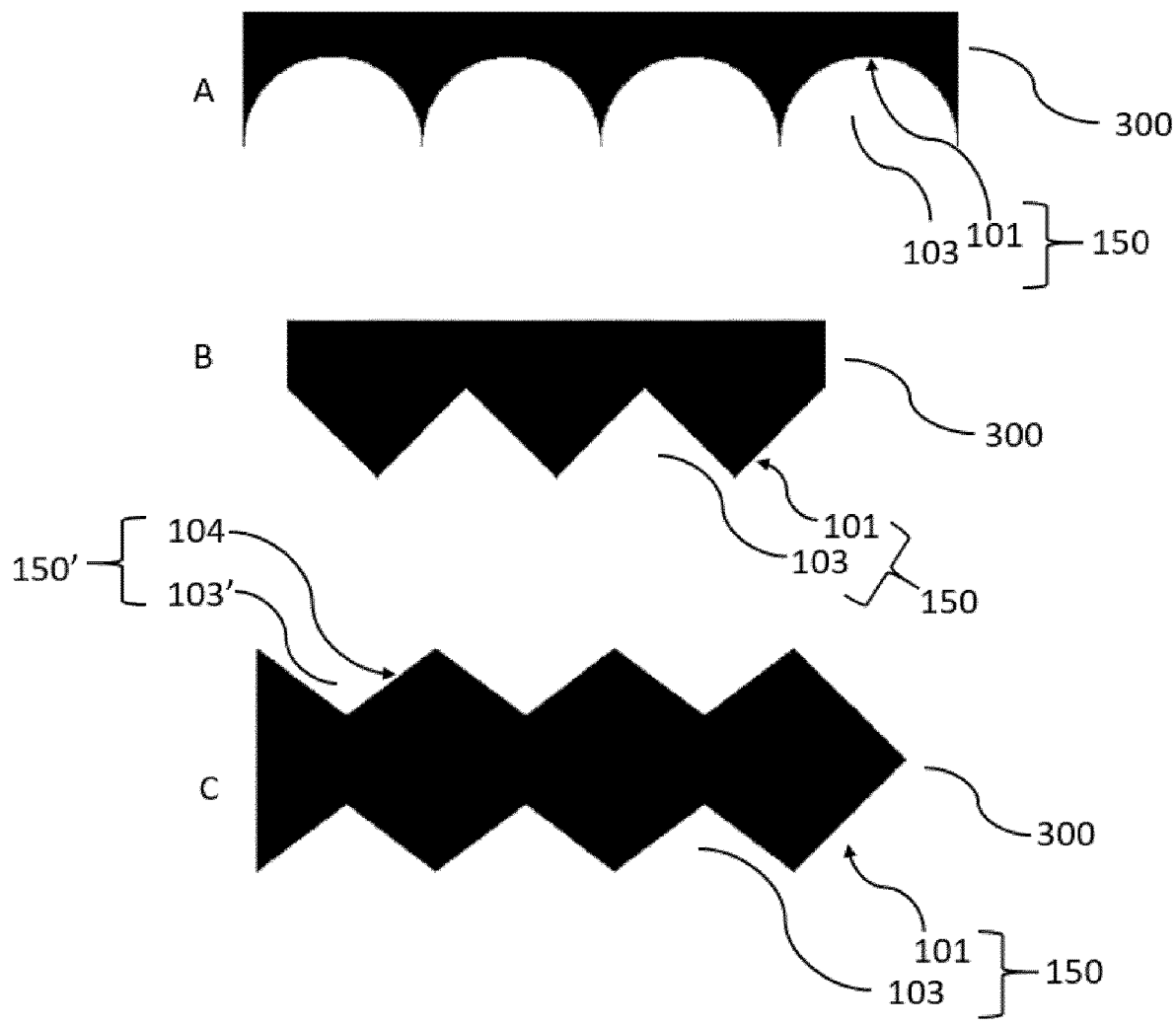
FIG. 4 is another schematic drawing of further cross-sectional shapes of a winding strand with various profiled recesses according to some embodiments of the present invention.

FIG. 4 is schematic drawing of various cross-sectional shapes of a winding string 300 with various profiled recesses 150 according to some embodiments of the present invention.

FIG. 4A shows a fourth variant of a winding strand 300 with a void 103 having a circular shape, formed from the profiled recess 150 of the inner surface 101 of the winding strand 300.

FIG. 4B shows a fifth variant of a winding strand 300 with a void 103 having a triangular shape, formed from the profiled recess 150 of the inner surface 101 of the winding strand 300.

FIG. 4C shows a sixth variant of a winding strand 300 with a void 103 having a triangular shape, formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

Figure 5:
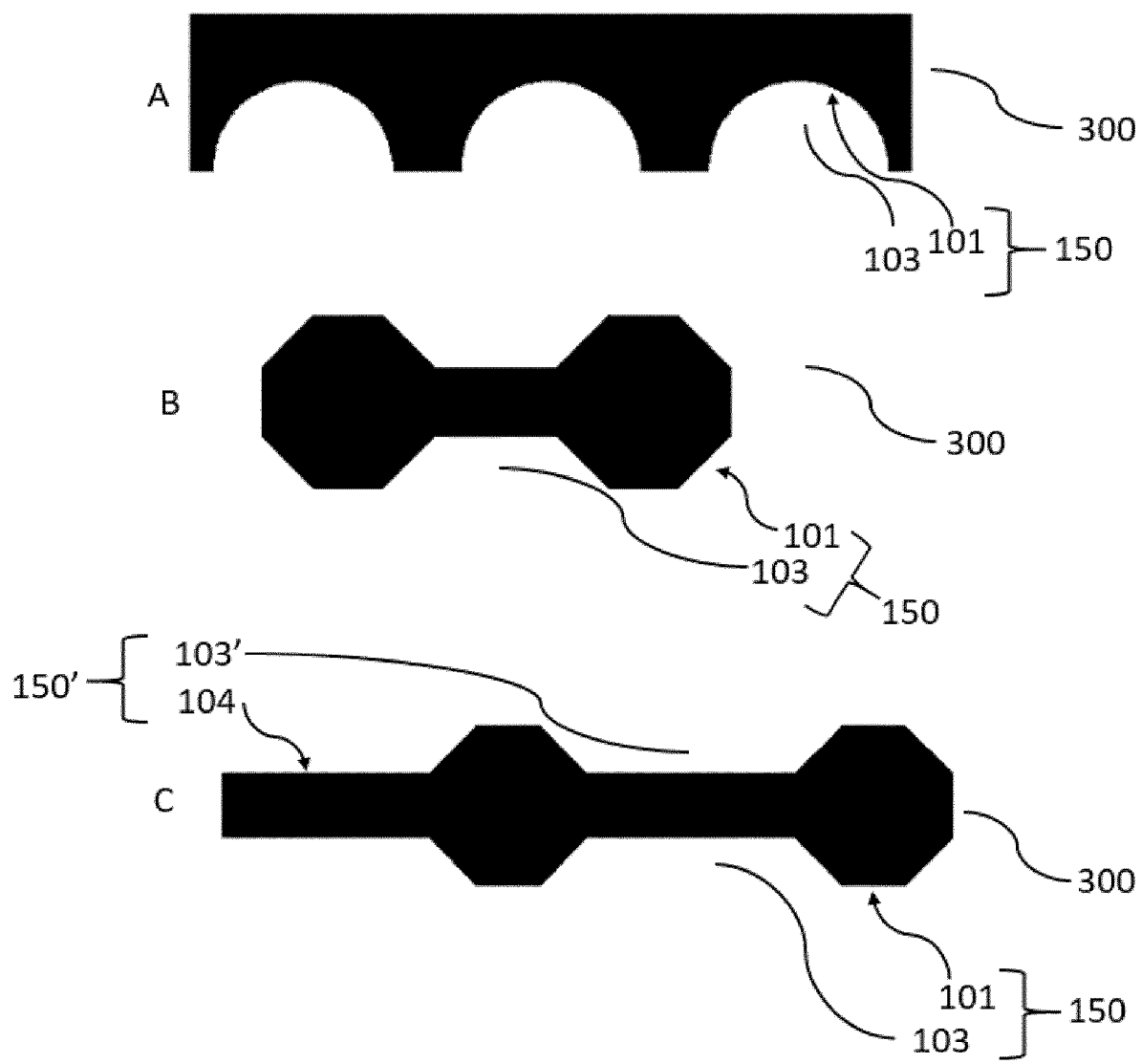
FIG. 5 is another schematic drawing of further cross-sectional shapes of a winding strand with various profiled recesses according to some embodiments of the present invention.

FIG. 5 is schematic drawing of various cross-sectional shapes of a winding strand 300 with various profiled recesses 150 according to some embodiments of the present invention.

FIG. 5A shows a seventh variant of a winding strand 300 with a void 103 having a circular shape, formed from the profiled recess 150 of the inner surface 101 of the winding strand 300.

FIG. 5B shows an eighth variant of a winding strand 300 with a void 103 having an open-angled square shape, formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

FIG. 5C shows a ninth variant of a winding strand 300 with a void 103 having an open-angled square shape similar to FIG. 5B, but wherein the void 103 is wider along the length of the winding strand 300 compared to FIG. 5B, the void 103 being formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300. Furthermore the profiled recess 150 is open-ended at one end.

Figure 6:
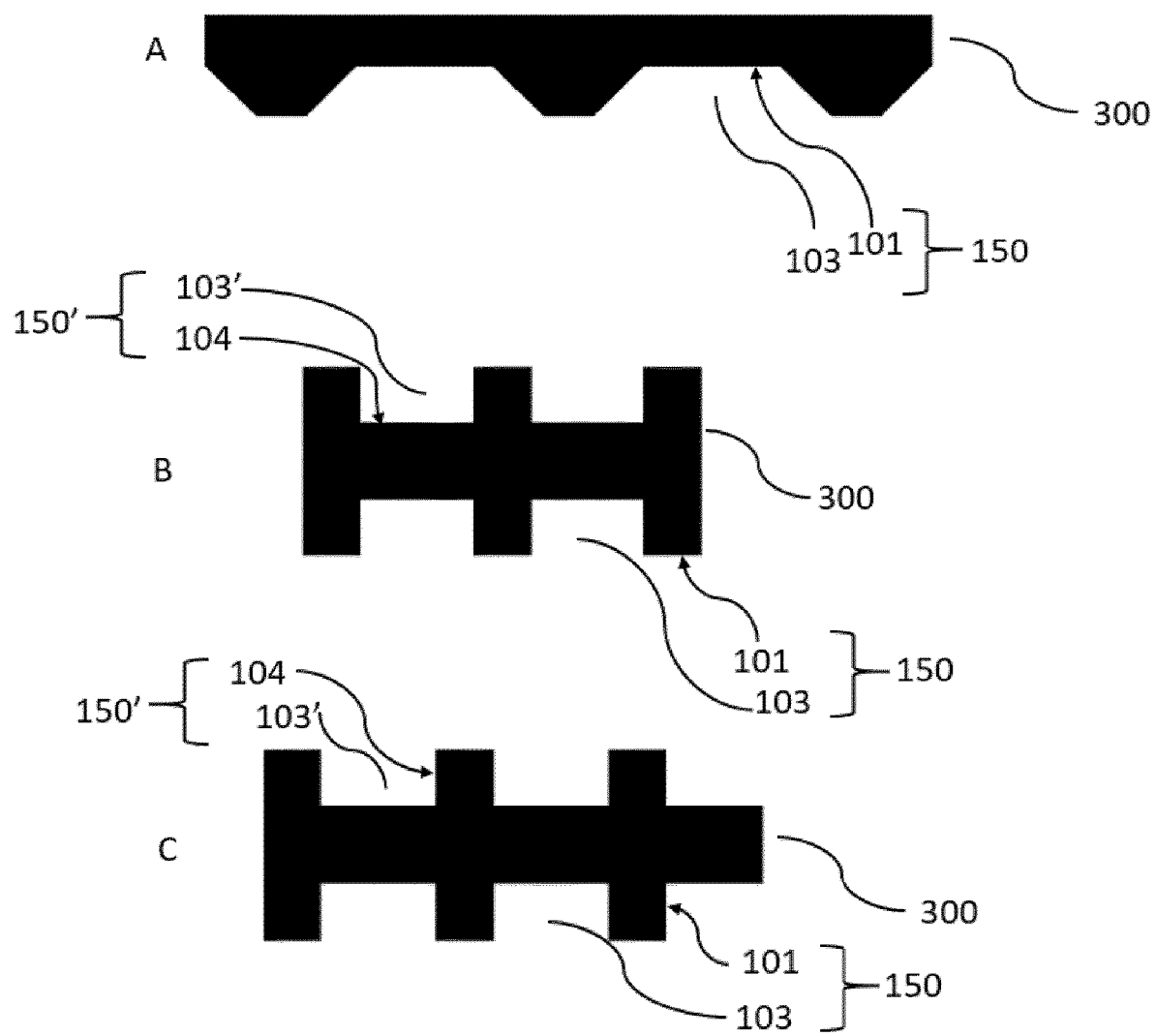
FIG. 6 is another schematic drawing of further cross-sectional shapes of a winding strand with various profiled recesses according to some embodiments of the present invention.

FIG. 6 is schematic drawing of various cross-sectional shapes of a winding strand 300 with various profiled recesses 150 according to some embodiments of the present invention.

FIG. 6A shows a tenth variant of a winding strand 300 with a void 103 having an open-angled square shape, formed from the profiled recess 150 of the inner surface 101 of the winding strand 300. The void 103 of FIG. 6A is similar to that of FIG. 5B, but the winding strand 300 of this figure only has a profiled recess 150 on the inner surface as opposed to FIG. 5B.

FIG. 6B shows an 11'th variant of a winding strand 300 with a void 103 having a square shape, the void 103 being formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

FIG. 6C shows a 12'th variant of a winding strand 300 with a void 103 having a square shape similar to FIG. 6B, but wherein the profiled recess 15 is open-ended at ones end compared to FIG. 6B, the void 103 being formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

Figure 7:
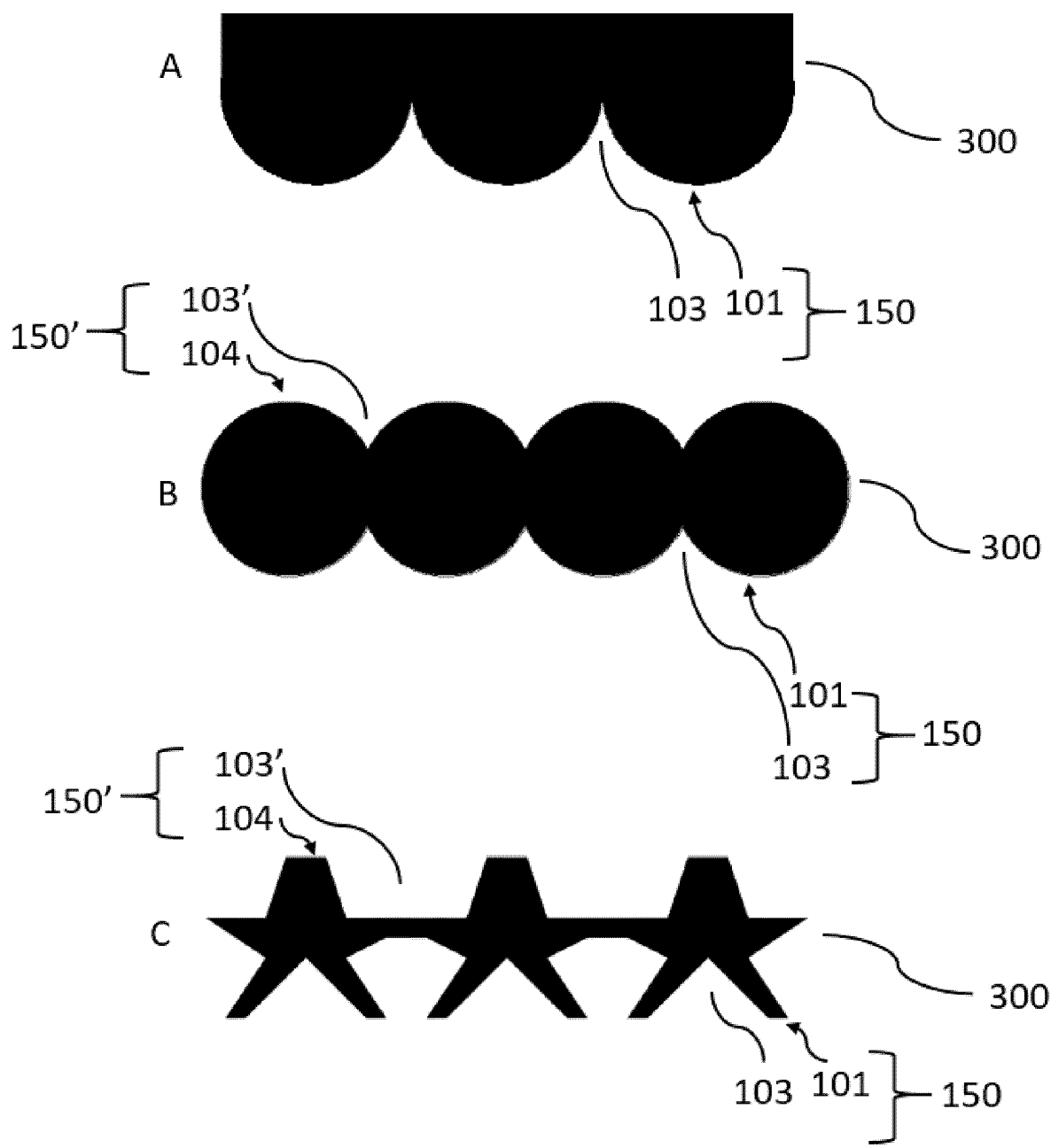
FIG. 7 is another schematic drawing of further cross-sectional shapes of a winding strand with various profiled recesses according to some embodiments of the present invention.

FIG. 7 is schematic drawing of various cross-sectional shapes of a winding strand 300 with various profiled recesses 150 according to some embodiments of the present invention.

FIG. 7A shows a 13'th variant of a winding strand 300 with a void 103 having a round funnel shape, formed from the profiled recess 150 of the inner surface 101 of the winding strand 300.

FIG. 7B shows a 14'th variant of a winding strand 300 with a void 103 having a round funnel shape, formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300.

FIG. 7C shows a 15'th variant of a winding strand 300 having alternately a diamond shaped and triangular void 103, formed from the profiled recess 150 of the inner surface 101 of the winding strand 300. On this particular embodiment, the outer surface 104 has a void 103' differing in shape from the inner surface 101 of the winding strand 300, the shape of the void 103' being an open angled square shape.

It should be noted that depending on which way the winding strand 300 is wound around a core, the inner and outer surface 101 and 104 can be interchanged so that the inner surface 101 of the winding strand 300 can become the outer surface 104 of the string.

Figure 8:
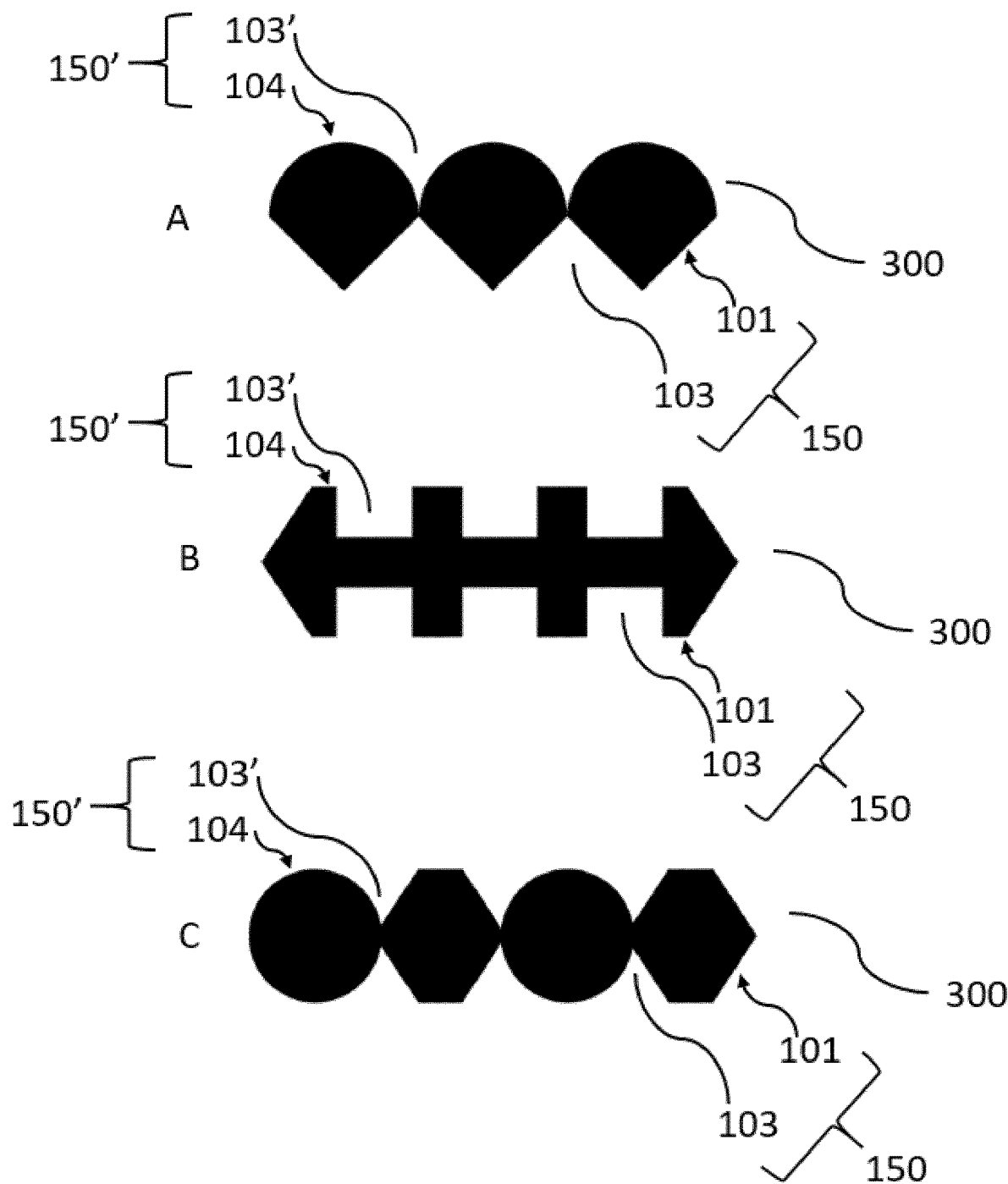
FIG. 8 is another schematic drawing of further cross-sectional shapes of a winding strand with various profiled recesses according to some embodiments of the present invention.

FIG. 8 is schematic drawing of various cross-sectional shapes of a winding strand 300 with various profiled recesses 150 according to some embodiments of the present invention.

FIG. 8A shows a 16'th variant of a winding strand 300 having a triangular void 103, formed from the profiled recess 150 of the inner surface 101 of the winding strand 300. On this particular embodiment, the outer surface 104 has a void 103' differing in shape from the inner surface 101 of the winding strand 300, the shape of the void 103' being a round funnel shape. It should be noted that depending on which way the winding strand 300 is wound around a core, the inner and outer surface 101 and 104 can be interchanged so that the inner surface 101 of the winding strand 300 can become the outer surface 104 of the string.

FIG. 8B shows an 17'th variant of a winding strand 300 with a void 103 having a square shape, the void 103 being formed from the profiled recess 150 of the inner surface 101 of the winding strand 300. On this particular embodiment the outer surface 104 of the winding strand 300 has a void 103' formed from a profiled recess 150' identical to the void 103 formed from the profiled recess 150 of the inner surface 101 of the winding strand 300. Furthermore the ends of the winding strand are arrow shaped, which will form a triangular shape at the gaps of adjacent windings.

FIG. 8C shows an 18'th variant of a winding strand 300 with a void 103 having alternately a half round funnel shape and half triangular void 103, formed from the profiled recess 150 of the inner surface 101 of the winding strand 300. On this particular embodiment the outer surface 104 of the winding strand 300 has a void 103' formed from a profiled recess 150' longitudinally mirrored to the void 103 formed from the profiled recess 150 of the inner surface 101 of the winding strand 300. Furthermore one end of the winding strand are arrow shaped and the opposite end is rounded, forming a gap in between adjacent windings similar to each of the voids 103 and 103'.

Figure 9:
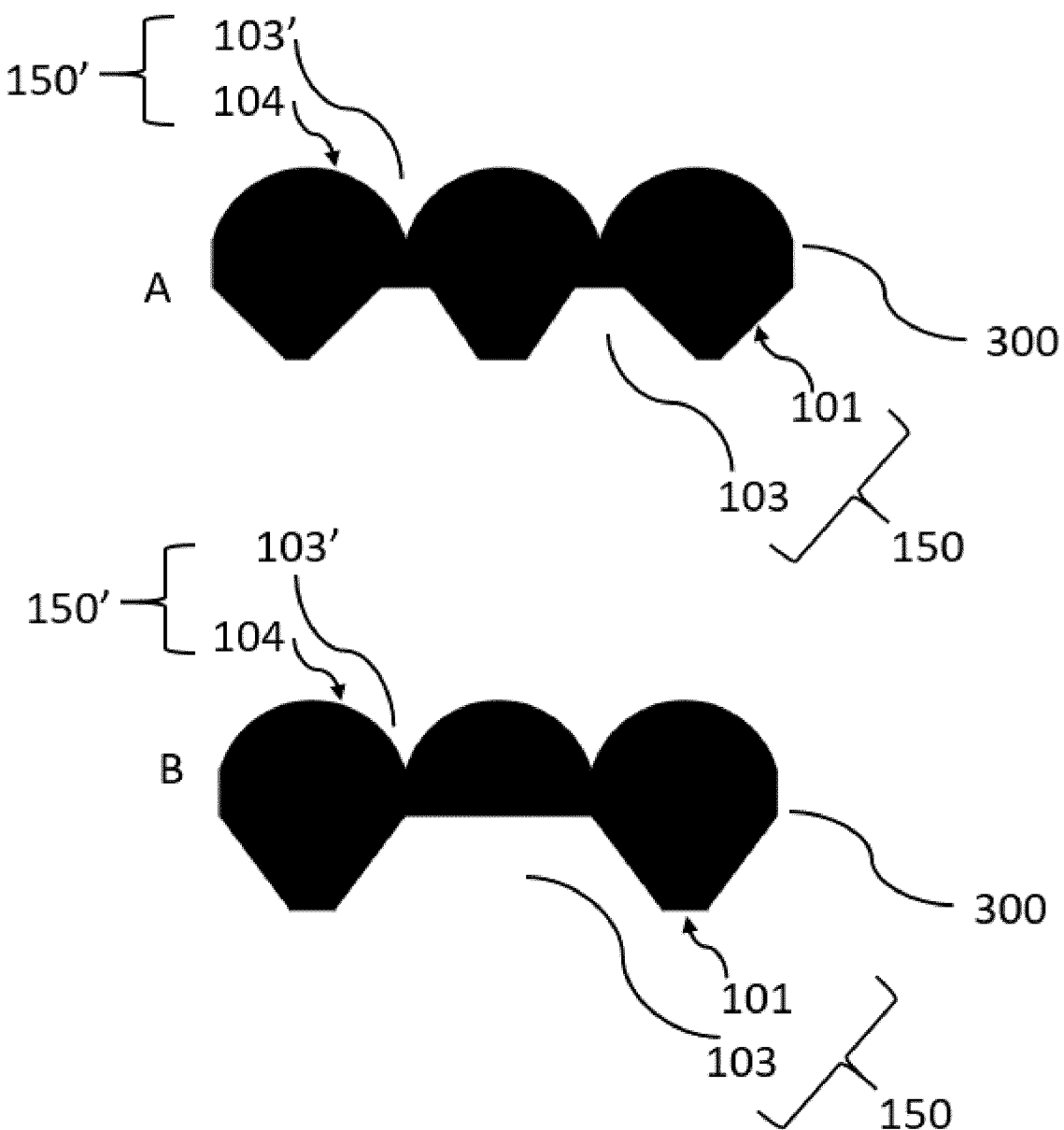
FIG. 9 is another schematic drawing of further cross-sectional shapes of a winding strand with various profiled recesses according to some embodiments of the present invention.

FIG. 9 is schematic drawing of various cross-sectional shapes of a winding strand 300 with various profiled recesses 150 according to some embodiments of the present invention.

FIG. 9A shows a 19'th variant of a winding strand 300 having an open angled square or rhomboid void 103, formed from the profiled recess 150 of the inner surface 101 of the winding strand 300. On this particular embodiment, the outer surface 104 has a void 103' differing in shape from the inner surface 101 of the winding strand 300, the shape of the void 103' being a round funnel shape. It should be noted that depending on which way the winding strand 300 is wound around a core, the inner and outer surface 101 and 104 can be interchanged so that the inner surface 101 of the winding strand 300 can become the outer surface 104 of the string.

FIG. 9B shows a 20'th variant of a winding strand 300 having an open angled square or rhomboid void 103 wider than the void 103 of FIG. 9A, formed from the profiled recess 150 of the inner surface 101 of the winding strand 300. On this particular embodiment, the outer surface 104 has a void 103' differing in shape from the inner surface 101 of the winding strand 300, the shape of the void 103' being a round funnel shape. It should be noted that depending on which way the winding strand 300 is wound around a core, the inner and outer surface 101 and 104 can be interchanged so that the inner surface 101 of the winding strand 300 can become the outer surface 104 of the string.

Figure 10:
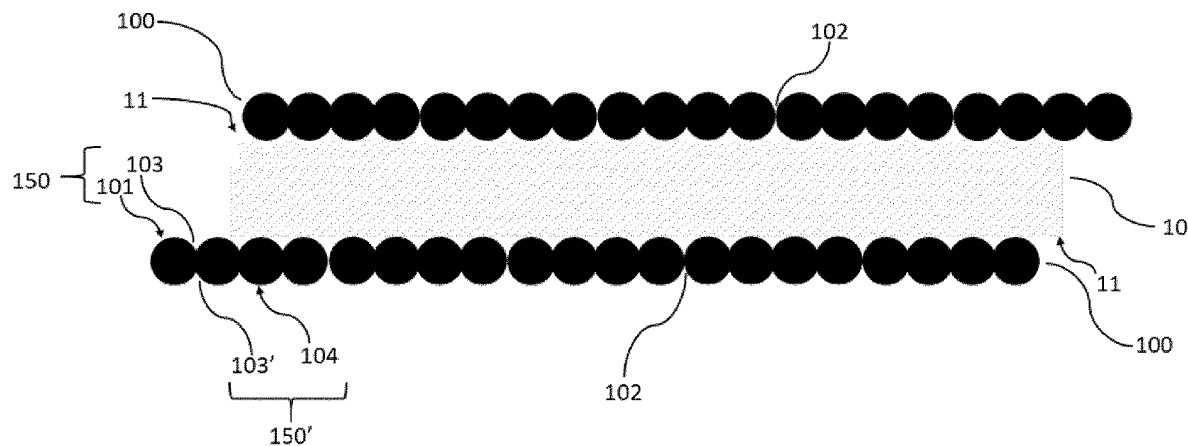
FIG. 10 is a schematic drawing of a string with a core and winding strand wound around said core.

FIG. 10 is a schematic drawing of a core 10 with a first winding strand 100 helically wound around said core 10 forming gaps 102 in between the windings. The winding strand has a profiled recess 150 on the inner surface 101 forming a round funnel shaped void 103. On the outer surface 104 of the first winding strand 100, a similar profiled recess 150' forms a round funnel shaped void 103'.

Figure 11:
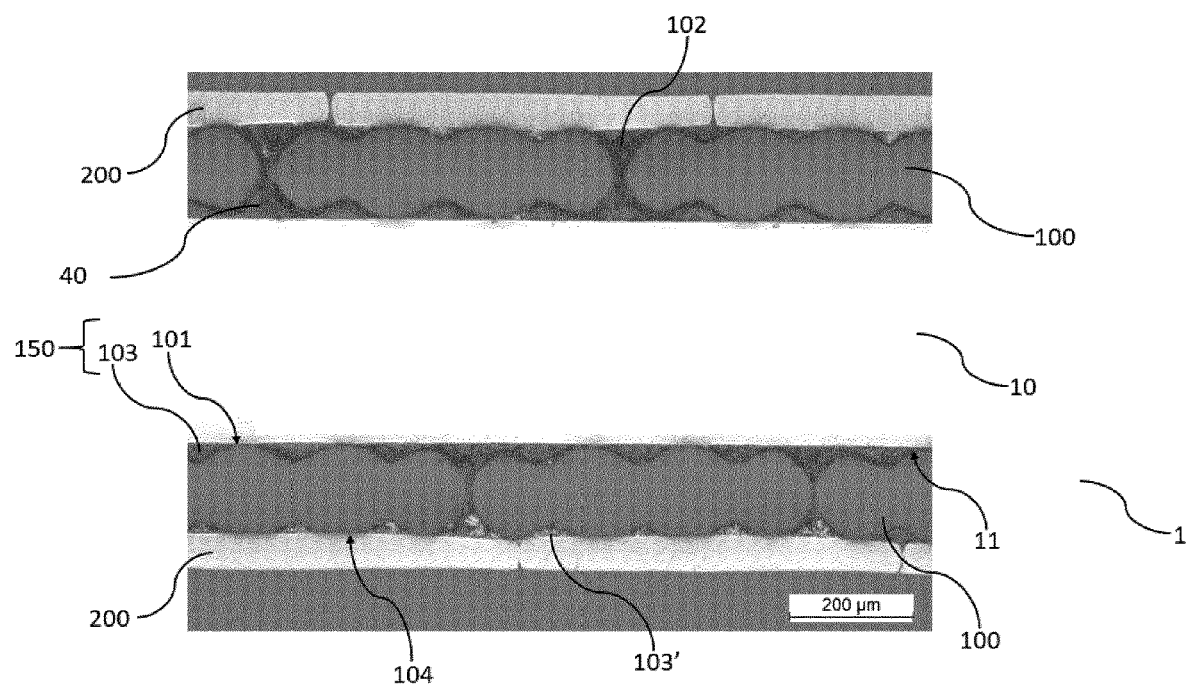
FIGS. 11 and 12 show two microscopic photographs made of cross-sections of strings according the present invention.
Figure 12:
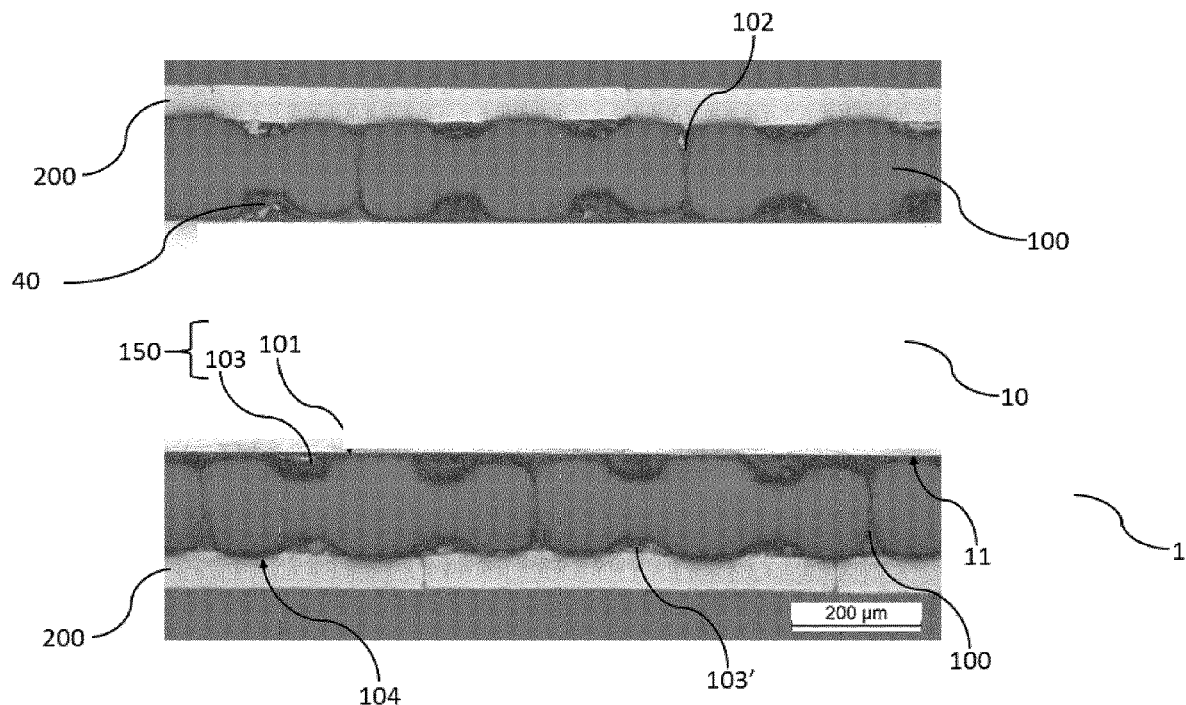

FIGS. 11 and 12 show two microscopic photographs made of cross-sections of strings according the present invention.

FIG. 11 shows a longitudinal cross section of a music string 1 at high microscopic magnification. The large, light part in the middle shows the load bearing core 10, a steel wire. On both sides, above and below of the core 10, the first winding strand 100 with profiled recesses 150 on an inner 101 and outer 104 surface are visible. The profiled recess 150 form rounded voids 103 containing the damping agent 40 in the interface between the core 10 and the first winding strand 100 in these profiled recess areas 150. The outer light area above and below the core 10 shows the second and final winding strand 200, a flattened metal wire, covering the profiled outer surface 104 of the first winding strand 100 forming voids 103'. The first winding strand 100 are wound around the outer surface 11 of the core 10, forming gaps 102 in between each of the adjacent windings.

FIG. 12 shows a longitudinal cross section of a music string 1 at high microscopic magnification. The large, light part in the middle shows the load bearing core 10, a steel wire. On both sides, above and below of the core 10, the first winding strand 100 with profiled recesses 150 on an inner 101 and outer 104 surface are visible. The profiled recess 150 form square shaped voids 103 containing the damping agent 40 in the interface between the core 10 and the first winding strand 100 in these profiled recess areas 150. The outer light area above and below the core 10 shows the second and final winding strand 200, a flattened metal wire, covering the profiled outer surface 104 of the first winding strand 100 forming voids 103'. The first winding strand 100 are wound around the outer surface 11 of the core 10, forming gaps 102 in between each of the adjacent windings.

Figure 13:
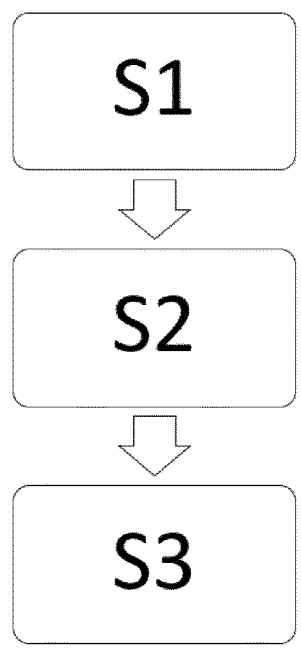
FIG. 13 is a flow-chart of a method according to the invention.

FIG. 13 is a flow-chart of a method according to the invention for containing and/or retaining a damping agent between an outer surface of a first load bearing core and an inner surface of a first winding strand of a musical instrument, preferably a bowed musical instrument, such as a violin, viola or cello, the method comprising:

S1—creating a profiled recess on the inner surface of the first winding strand,

S2—applying a damping agent to the outer surface of the first core and/or to said profiled recess on the first winding strand, and S3—winding the first winding strand around the outer surface of the first core in a helical manner, with the profiled recess of the inner surface of the first winding strand oriented towards the outer surface of said first core, so as to enable the damping agent applied to the outer surface of the first core to be contained and/or retained in the profiled recess of the winding strand when the inner surface of the first winding strand comes into contact with the outer surface of the first core and thus the damping agent positioned on said outer surface.

In a preferred embodiment of the invention, the string for a bowed musical instrument has a core consisting of a round, solid steel core. Said steel core may have a diameter of between 0.100 mm and 0.600 mm or more preferably between 0.300 mm and 0.400 mm. On said steel core, a layer of damping agent is applied. On top of the damping agent, a polymer strand with a recessed surface is wound, in which said damping agent may be contained. The polymer strand may have a width of between 0.200 mm and 0.700 mm or more preferably between 0.400 mm and 0.500 mm and a height of between 0.050 mm and 0.300 mm or more preferably a height between 0.140 mm to 0.170 mm. The recessed polymer strand has between one and six recesses, more preferably between two and five recesses and most preferably three recesses. Further, said recessed polymer strand has a profile as illustrated in FIG. 3, profile B. On top of the recessed polymer strand a flat metal winding layer is positioned, said flat metal winding layer having of width between 0.200 mm and 0.800 mm and more preferably a width between 0.500 mm and 0.600 mm and a height between 0.010 mm and 0.200 or more preferably a height between 0.040 mm to 0.090 mm.

In another preferred embodiment of the invention, the string for a bowed musical instrument has a core consisting of a steel rope core structure of diameter between 0.010 mm and 0.600 mm or more preferably a diameter between 0.350 mm and 0.420 mm. On said steel rope core, a layer of damping agent is applied. On top of said damping agent, a recessed polymer strand with a recessed surface is wound, in which said damping agent can be contained. The polymer strand has a width between 0.200 mm and 0.700 mm or more preferably a width between 0.400 mm and 0.500 mm and a height between 0.050 mm and 0.300 mm or more preferably a height between 0.140 mm to 0.170 mm. The recessed polymer strand has between one and six recesses, more preferably between two and five recesses and most preferably three recesses. Further, said recessed polymer strand has profile as illustrated in FIG. 3, profile B. On top of said recessed polymer strand a flat metal winding layer is positioned, said flat metal winding layer having a width between 0.300 mm and 0.800 mm or more preferably a width between 0.500 mm and 0.600 mm and a height between 0.010 mm and 0.200 mm or more preferably a height between 0.040 mm to 0.090 mm.

In an advantageous embodiment of the invention, the string for a bowed musical instrument has a core consisting of a round, solid steel core with a diameter of between 0.100 mm and 0.600 mm or more preferably a diameter of between 0.300 to 0.400 mm. On the core, a layer of damping agent is applied. On top of the core and said damping agent, a recessed winding strand made from aluminum is applied. Said winding strand has a recessed strand with a profile similar to the profile illustrated in FIG. 5, profile A. The recessed strand has a width of between 0.200 mm and 0.800 mm or more preferably a width between 0.450 mm and 0.550 mm and a height of between 0.050 mm and 0.400 mm or more preferably a height of between 0.150 mm and 0.200 mm. On top of said recessed polymer strand a flat metal winding layer is positioned, said flat metal winding layer having a width of between 0.300 mm and 0.800 mm or more preferably a width between 0.500 mm and 0.600 mm and a height of between 0.010 mm and 0.200 mm or more preferably a height of between 0.040 mm to 0.090 mm.

In another advantageous embodiment of the invention, the string for a bowed musical instrument has a round steel core with a diameter of between 0.100 mm and 0.600 mm or more preferably a diameter of between 0.300 mm and 0.400 mm. A flat layer of aluminum with a height of between 0.010 mm and 0.200 mm or more preferably a height of 0.050 mm, is wound around said core. On top of the flat layer of aluminum, a layer of damping agent is applied. On top of the flat layer of aluminum and the damping agent, a polymer recessed winding strand is wound, which has a width of between 0.100 mm and 0.500 mm or more preferably a width of between 0.300 mm to 0.350 mm and a height of between 0.050 mm and 0.300 mm or more preferably a height of between 0.120 mm and 0.140 mm and wherein said polymer recessed winding strand has a profile similar to that of FIG. 6, profile B. On top of said recessed polymer winding strand, a flat metal winding layer is positioned, said flat metal winding strand having a width of between 0.300 mm and 0.800 mm or more preferably a width of between 0.500 mm and 0.600 mm and a height of between 0.010 mm and 0.200 mm or more preferably 0.040 mm to 0.090 mm.

In yet another advantageous embodiment of the invention, the string for a bowed musical instrument has a round steel core with diameter of between 0.100 mm and 0.400 mm or more preferably a diameter of between 0.220 mm and 0.280 mm. On top of said core, a layer of damping agent is applied. On top of the core and damping agent, a recessed winding strand made of a polymer material is wound. Said recessed winding strand has a width of between 0.100 mm and 0.500 mm or more preferably a width of between 0.300 mm and 0.350 mm and a height of between 0.050 mm and 0.300 mm or more preferably a height of between 0.100 and 0.120 mm. Said recessed winding strand may have a profile similar to the profile illustrated in FIG. 3, profile C. On top of said recessed polymer strand, a flat metal winding layer is positioned, said flat metal winding layer having a width of between 0.050 mm and 0.700 mm or more preferably a width of between 0.200 mm and 0.500 mm and a height of between 0.010 mm and 0.150 mm or more preferably a height of between 0.030 mm and 0.060 mm.

In yet another advantageous embodiment of the invention, the string for a bowed musical instrument has a core consisting of a round, solid steel core. Said steel core has a diameter of between 0.100 mm and 0.600 mm or more preferably a diameter between 0.300 mm and 0.400 mm. On said steel core, a layer of damping agent is applied. On top of said damping agent, a polymer strand with a recessed surface is wound, in which said damping agent can be contained. The polymer strand has a width of between 0.200 mm and 0.700 mm or more preferably a width between 0.400 mm and 0.500 mm and a height of between 0.050 mm and 0.300 mm or more preferably a height between 0.140 mm to 0.170 mm. The recessed polymer strand has between one and six recesses, more preferably between two and five recesses and most preferably three recesses. Further, said recessed winding strand has a profile as illustrated in FIG. 3, profile B. On top of the recessed polymer strand, a round metal winding layer is positioned, said round metal winding layer having a diameter of between 0.005 mm and 0.200 mm or more preferably a diameter between 0.010 mm and 0.100 mm. On top of the round metal winding layer, a flat metal winding layer is positioned, said flat metal winding layer having a width of between 0.050 mm and 0.700 mm or more preferably a width between 0.200 mm and 0.500 mm and a height of between 0.005 mm and 0.200 mm or more preferably a height between 0.030 mm and 0.060 mm.

It is to be understood that the steel core in any of the above embodiments may be replaced by a fiber core comprising one or more fiber strands.

In short, the invention relates to a string 1 for a stringed, bowed musical instrument, for example a bowed musical instrument like a violin, viola or cello. The string has a first, load bearing core 10 and a winding strand 100 wound around the first core in helical windings. A damping agent 40 suitable for vibration damping is arranged in a profiled recess 150 in the winding strand. The recess is functioning as a reservoir between the first core and the winding strand. The reservoir is containing and/or retaining the damping agent so as to, at least, reduce dissipation of the damping agent through a gap between the adjacent helical windings of the winding strand. The invention results in a longer lifetime with optimum acoustic properties of the string.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A string for a stringed instrument, comprising:
   at least one first load bearing core having an outer surface,
   at least one first winding strand wound around the first load bearing core in helical windings, said first winding strand having an inner surface wherein said inner surface of the first winding strand is opposing the outer surface of the first load bearing core, and
   at least one damping agent suitable for vibration damping, said damping agent arranged in between the outer surface of the first load bearing core and the inner surface of the first winding strand,
   wherein the inner surface of the first winding strand comprises at least one profiled recess at said inner surface, said recess functioning as a reservoir between the first load bearing core and the first winding strand, said reservoir being suitable for containing and/or retaining the damping agent so as to, at least, reduce dissipation of said damping agent through a gap between the adjacent helical windings of the first winding strand.

2. A string according to claim 1, wherein the first winding strand furthermore has an outer surface and wherein said outer surface of the first winding strand has a profiled recess suitable for containing and/or retaining a damping agent.

3. A string according to claim 2, further comprising a damping agent contained and/or retained within the profiled recess of the outer surface of the first winding strand, said damping agent being the same or differing from the damping agent contained and/or retained within the profiled recess of the inner surface of said first winding strand.

4. A string according to claim 2, wherein the profiled recess on the inner surface of the first winding strand differs in size and/or shape from the profiled recess on the outer surface of said first winding strand.

5. A string according to claim 1, further comprising a second winding strand wound around the first load bearing core in parallel and adjacent to the helical windings of the first winding strand, wherein said second winding strand has a profiled recess on an inner and/or outer surface of the second winding strand, the profiled recess on an inner and/or outer surface of the second winding strand differing in size and/or shape from a corresponding profiled recess of an inner and/or outer surface of the first winding strand.

6. A string according to claim 5, further comprising a third winding strand wound around the first load bearing core, in a helical manner, in parallel and adjacent to the helical windings of the first winding strand and/or the second winding strand, wherein said third winding strand has a profiled recess on an inner and/or outer surface differing in size and/or shape from a corresponding profiled recess of an inner and/or outer surface of winding strand adjacent to the third winding strand.

7. A string according to claim 1, wherein a cross-sectional area of the profiled recess extending, at least partly, along a length of either an inner or outer surface of the first winding strand and a cross-sectional area of said first winding strand has a ratio of between 1:100 and 10:1.

8. A string according to claim 1, wherein a cross-sectional area of the first winding strand and/or a cross-sectional area of the profiled recess, at least partly along a length, of an inner surface and/or outer surface of the first winding strand defines a profile characterized as round, triangular, rectangular, squared, pentagonal, hexagonal, heptagonal, octagonal, star-shaped, arch-indented, wave, or any combination thereof.

9. A string according to claim 1, wherein the first load bearing core comprises a metal or a polymer.

10. A string according to claim 1, wherein the first winding strand comprises polymer.

11. A string according to claim 5, wherein the second winding strand is made from a material differing from a material of the first winding strand.

12. A string according to claim 1, wherein the first winding strand is wound around the first load bearing core in a helical manner at an angle relative to a length axis of the first load bearing core between 10 and 170 degrees.

13. A method for manufacturing strings for a stringed instrument, comprising:
providing a first load bearing core having an outer surface,
providing a first winding strand having an inner surface, said inner surface comprising a profiled recess, at least partly, along a length of the inner surface,
applying a damping agent to the outer surface of the first load bearing core and/or to said profiled recess on the first winding strand, and
winding the first winding strand around the first load bearing core in a helical manner,
so as to substantially cover the outer surface of the first load bearing core with the first winding strand and wherein the damping agent is contained and/or retained in the profiled recess of said first winding strand.

14. A method for containing and/or retaining a damping agent between an outer surface of a first load bearing core and an inner surface of a first winding strand of a stringed, bowed musical instrument, such as a violin, viola or cello, the method comprising:

creating a profiled recess on the inner surface of the first winding strand,
applying a damping agent to the outer surface of the first load bearing core and/or to said profiled recess on the first winding strand, and
winding the first winding strand around the outer surface of the first load bearing core in a helical manner, with the profiled recess of the inner surface of the first winding strand oriented towards the outer surface of said first load bearing core,
the winding performed so as to enable the damping agent applied to the outer surface of the first load bearing core to be contained and/or retained in the profiled recess of the winding strand when the inner surface of the first winding strand comes into contact with the outer surface of the first load bearing core and thus the damping agent positioned on said outer surface.

15. A string according to claim 1, wherein the string is installed within a stringed musical instrument that comprises a base and a neck, the string being attached at, or near the base and at, or near the neck.

16. A string according to claim 6, wherein the third winding strand is made from a material that (1) differs from a material of the first winding strand or (2) differs from a material of the second winding strand.

17. A string according to claim 5, wherein a cross-sectional area of the profiled recess extending, at least partly, along a length of either an inner or outer surface of the second winding strand and a cross-sectional area of said second winding strand has a ratio of between 1:100 and 10:1.

18. A string according to claim 6, wherein a cross-sectional area of the profiled recess extending, at least partly, along a length of either an inner or outer surface of the third winding strand and a cross-sectional area of said third winding strand has a ratio of between 1:100 and 10:1.

19. A string according to claim 5, wherein a cross-sectional area of the second winding strand and/or a cross-sectional area of the profiled recess, at least partly along a length, of an inner surface and/or outer surface of the second winding strand defines a profile characterized as round, triangular, rectangular, squared, pentagonal, hexagonal, heptagonal, octagonal, star-shaped, arch-indented, wave, or any combination thereof.

20. A string according to claim 6, wherein a cross-sectional area of the third winding strand and/or a cross-sectional area of the profiled recess, at least partly along a length, of an inner surface and/or outer surface of the third winding strand defines a profile characterized as round, triangular, rectangular, squared, pentagonal, hexagonal, heptagonal, octagonal, star-shaped, arch-indented, wave, or any combination thereof.

* * * * *